No. 759,911. PATENTED MAY 17, 1904.
E. L. PERRY.
CIGAR BANDING MACHINE.
APPLICATION FILED APR. 13, 1903.
NO MODEL. 10 SHEETS—SHEET 1.

FIG. 1.

WITNESSES:
F. W. Wright
Walter Abt

INVENTOR
EUGENE L. PERRY
BY
Howson and Howson
HIS ATTORNEYS.

No. 759,911. PATENTED MAY 17, 1904.
E. L. PERRY.
CIGAR BANDING MACHINE.
APPLICATION FILED APR. 13, 1903.
NO MODEL. 10 SHEETS—SHEET 3.

WITNESSES:
F. W. Wright
Walter Abbe

INVENTOR
EUGENE L. PERRY
BY
Howson and Howson
HIS ATTORNEYS.

No. 759,911. PATENTED MAY 17, 1904.
E. L. PERRY.
CIGAR BANDING MACHINE.
APPLICATION FILED APR. 13, 1903.
NO MODEL. 10 SHEETS—SHEET 4.

FIG. 4.

WITNESSES:
F. W. Wright.
E. W. Collins

INVENTOR
EUGENE L. PERRY
BY
Howson and Howson
HIS ATTORNEYS.

No. 759,911. PATENTED MAY 17, 1904.
E. L. PERRY.
CIGAR BANDING MACHINE.
APPLICATION FILED APR. 13, 1903.
NO MODEL. 10 SHEETS—SHEET 5.

WITNESSES:
F.W.Wright
E.W.Collins

INVENTOR
EUGENE L. PERRY
BY
Howton and Howton
HIS ATTORNEYS.

No. 759,911. PATENTED MAY 17, 1904.
E. L. PERRY.
CIGAR BANDING MACHINE.
APPLICATION FILED APR. 13, 1903.
NO MODEL. 10 SHEETS—SHEET 6.

WITNESSES:
F. W. Wright.
E. N. Collins.

INVENTOR
EUGENE L. PERRY

BY
Howson and Howson
HIS ATTORNEYS

No. 759,911.

Patented May 17, 1904.

UNITED STATES PATENT OFFICE.

EUGENE L. PERRY, OF OCEAN GROVE, NEW JERSEY.

CIGAR-BANDING MACHINE.

SPECIFICATION forming part of Letters Patent No. 759,911, dated May 17, 1904.

Application filed April 13, 1903. Serial No. 152,397. (No model.)

*To all whom it may concern:*

Be it known that I, EUGENE L. PERRY, a citizen of the United States of America, residing in Ocean Grove, in the county of Monmouth, State of New Jersey, have invented certain new and useful Improvements in Cigar-Banding Machines, of which the following is a specification.

The main object of this invention is to construct a machine to band a cigar, particularly one freshly made and more or less moist or green, so that the cigar may be afterward dried and the band not become loose or wrinkle in position around the cigar as a result of shrinkage of the cigar in drying. My invention thus permits the banded cigars to be tightly packed once for all in the green state.

Further and incidental objects of this invention are to construct the machine so as to cause every cigar to be encircled by its band at the same center, to feed the band to all cigars without regard to their varying diameters, with the same length of upstanding band to be tucked under the overlapping end, to regulate the point of attachment of the band ends, to hold the cigar always firmly but resiliently, thus preventing injury to the cigar-wrapper through variation in the diameter of the cigars.

The machine of this invention consists of means for supplying a continuous strip of bands, means for feeding the cigar, generally in its green state, to a clutch-like carriage in which a band of the strip is caused to encircle the cigar, means for compressing the cigar where it is encircled by the band within the clutch-like carriage, means for detaching a band from the strip, means for pasting the band down around the cigar, and means for retaining the cigar slightly compressed in the carriage a sufficient length of time to cause the paste on the band to hold so strongly that the natural tendency of the band-encircled and compressed green cigar to expand after it has been discharged from the carriage is overcome by the tension of the pasted band.

In ordinary hand-banding as heretofore practiced cigars in the green state have been packed in the boxes, pressed down into the box, the box-lid fastened, and the cigars stored away until dried. After the cigars have been sufficiently dried a factory hand opens the box and removes each individual layer of cigars, keeping them in the same relative positions. These cigars are then banded by hand, the band being caused to encircle each cigar, and then the cigars are repacked in the box in the same relative positions to each other as they before occupied. This is of course a time-consuming, laborious, and difficult manipulation of the cigars and is the difficulty which I have overcome by this invention.

In the accompanying drawings, Fig. 10 is a sectional side elevation through the feed-case, knife, and vertical plunger immediately after the severance of the paper band. Fig. $10^a$ is a view broken off at the left of Fig. 10. Fig. 11 is a sectional view of the adjustable connecting-link between the knife and its operating-arm. Fig. 13 is a side elevation, partly in section, of the feed-case. Figs. $13^a$ and $13^b$ are details of the feed-pawl. Fig. $13^c$ is a section on line 13 13, Fig. 13. Fig. 14 is a plan view showing the bands. Figs. 15 and $15^a$ are views of a band encircled upon itself and pasted. Fig. 16 is a plan, Figs. 23, 24, and 25 are a plan, a side elevation, and a front elevation of the left-hand gripping-jaw. Fig. 26 is a view showing the metal blade to be secured to said jaw. Figs. 27 and 28 are respectively a plan and a side elevation of the bifurcated jaw. Figs. 29 and 30 are respectively a plan and a side elevation of the enlarged side plates forming the carriage-support. Fig. 31 is a view of the longer spring secured to the side plates, and Fig. 31$^a$ shows the smaller spring.

All these mechanisms I have shown controlled from a main cam-shaft 1, having two cams 2 and 3 and a revolving operating-lever 4 mounted thereon, the lever once in each revolution engaging a star-wheel 5, mounted on a shaft 6, journaled in a bracket 7, secured on the base B. A second bracket 7', secured to the base, forms a second bearing for the cam-shaft 1 and also provides bearings for certain levers to be hereinafter described.

Figures 13, 13A, 13B, 13C, 15, 15A:
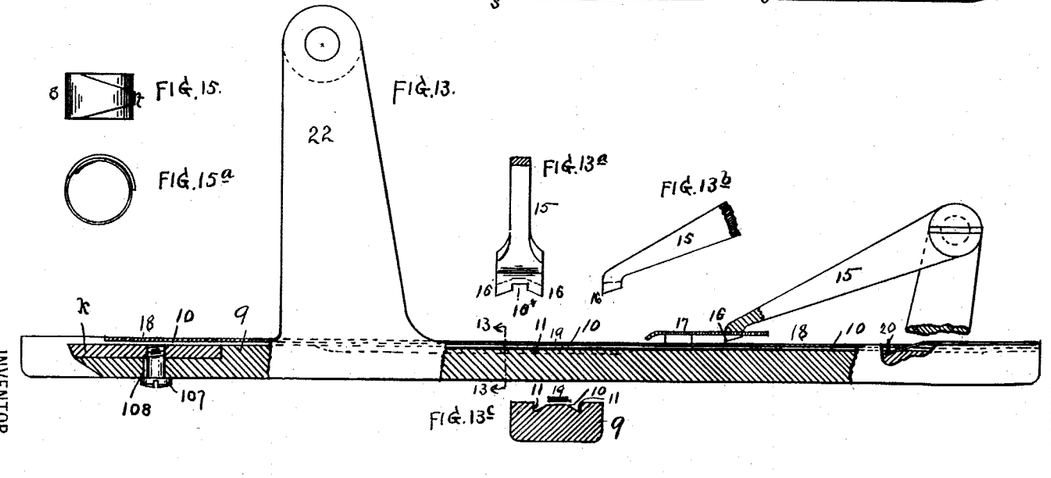
Figure 16:
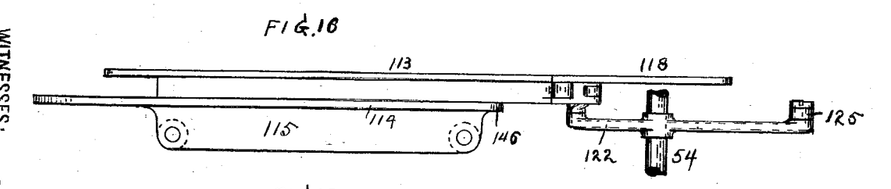
Figure 17:
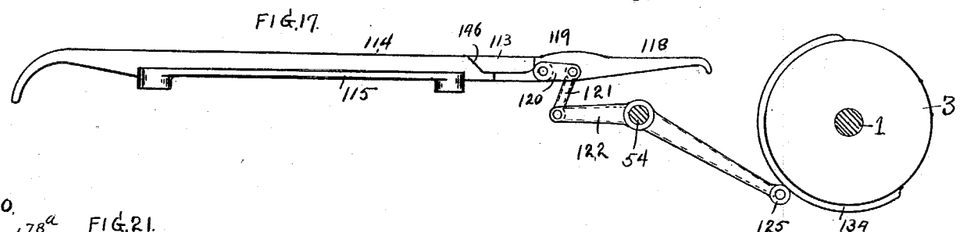
Fig. 17 is a side elevation, of the rails on which the rollers of the carriage-levers travel.
Figures 18, 19, 22:
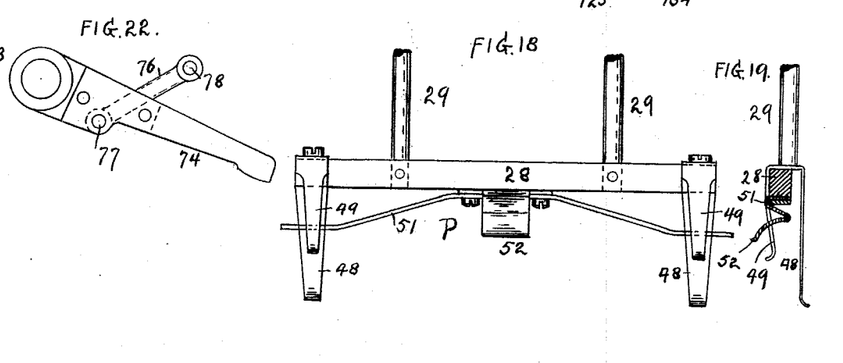
Fig. 18 is an enlarged partial view of the vertical plunger.
Fig. 19 is a section through the center thereof.
Figs. 20, 21, and 22 are details of the tucker-arm and operating mechanism.
Figures 20, 21:
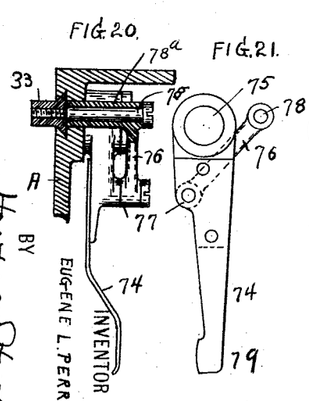

The strip of band is shown in Fig. 14 in one style in which it may be made, while Figs. 15 and 15$^a$ show the band after having been pasted in position encircling a cigar.

The mechanism for feeding the strip of paper bands 8 is shown best in Figs. 1, 3, 4, 5, 12, and 13 and consists of an extending feed-case 9, projecting to the right of the table A of the machine. The feed-case 9 has a channel 10 extending throughout its length of the width of a strip and of sufficient depth to allow the strip to be freely passed therethrough and is securely and firmly fastened beneath the table A by screws passing through holes $b^2$ $b^2$ in the lugs $b'$ and holes $b$ $b$ in the table A. The feed-case is formed for a distance of the groove 10 with two recessed grooves 11 of a greater depth than the groove 10. Each band has two shoulders $s$ $s$ formed at its rear end adjoining the end of a narrow tongue $t$, which is to form one end of the following band. The cam 3 is formed on its right-hand face with a cam-groove 12. This groove operates a roller 13 on the end of a bell-crank lever 14, pivoted at 14' to the bracket 7' to move a pawl 15, pivotally mounted on the upper end of the bell-crank 14. The free end of this pawl is formed, as shown in Figs. 13, 13$^a$, and 13$^b$, with two outside sharpened points 16 16 and a recessed central portion 16'. A bridge 17 in the center of and above the feed-case 9 serves to lift the pawl at a certain point of its travel entirely out of and free from the case 9. This is provided that the band may be entirely free from the influences of the pawl 15 at certain stages of the operation and also to lift the points 16 16 out of contact with the metal of the case to avoid wear. Except for an intermediate portion the entire case is covered by a plate 18 in two sections connected by a bridge part 19 at the intermediate portion. A spring 20 is secured at one end of the case 9 and projects through the aperture 21 in the plate 18. The paper strip from the paper-roll R, rotatably mounted on the arm $a$, secured to the base, is fed through the right-hand end by hand until it extends at least one band length beyond the beginning of the deep groove 11, in which position it is ready upon the forward movement of the pawl 15 to be engaged. The two outside points 16 16 of the pawl on moving forward descend from the bridge 17 and extend toward the bottom of the groove 11 astraddle the bridge 19. These points come in contact with the shoulders $s$ $s$ of the band within the case 9 and will thus feed the strip forward always the same distance—$i.$ $e.$, the length of stroke of the bell-crank lever 14 and pawl 15. The spring 20 acts as a detaining-pawl to prevent any backward motion of the band by abutting against one of the shoulders $s$ if there is a tendency of the strip to back out of the case. An upwardly-projecting arm 22, fitting within a slot 22', formed in the top of table A, is formed on the case, having a bearing at its upper end for the purpose now to be described.

On the before-mentioned bell-crank lever 14 at its lower end a rod 23 is freely pivoted. This extends upwardly and is freely pivoted to a lever 24, pivoted to the before-mentioned arm 22. This lever 24 serves to operate a plunger and a knife for severing the individual band from the strip. A chute 25, having guides 26, is secured to the table A. At the back of the chute are guide-lugs 27 27, serving as bearings for a vertically-reciprocating plunger P, carried at the ends of rods 29 29. A bar 28, securely fastened to the plunger-rods 29 29, is controlled by the lever 24 and is operated thereby, for which purpose a slotted end 30 is formed on the lever, engaging a cross-piece 31, attached to the rods 29 29.

A link 32 connects the lever 24 with the knife K, to be more specifically described hereinafter.

Figure 32:
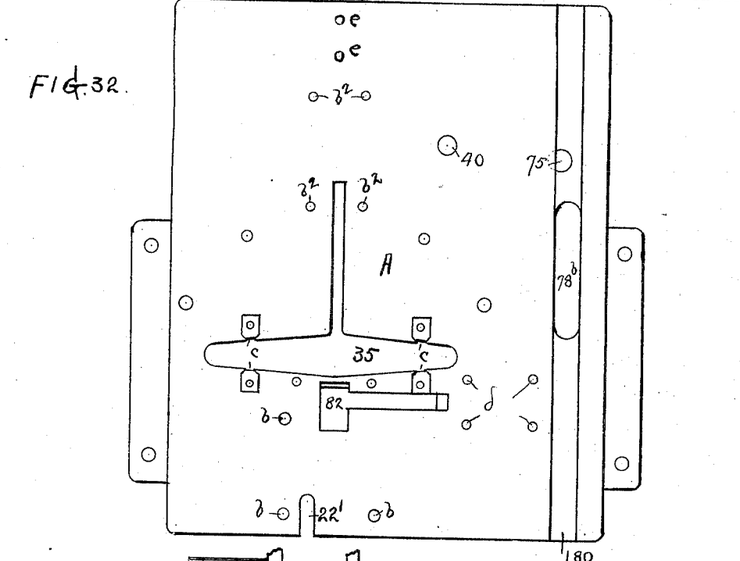
Fig. 32 is a top view of the table A dismantled.
Figure 33:
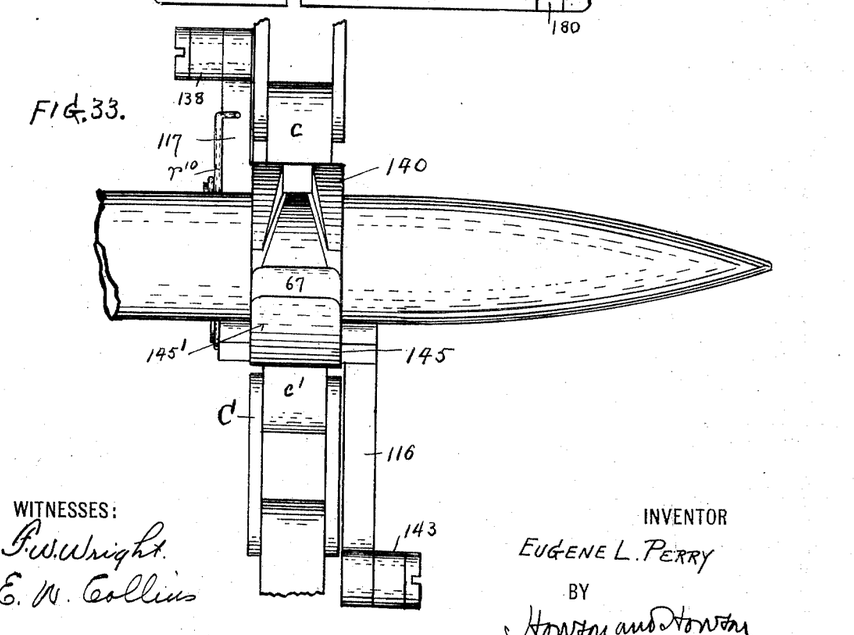
Fig. 33 is an enlarged plan view of the carriage and cigar held therein.

The table A (shown dismantled in Fig. 32) is formed with a lengthwise slide-groove 180, in which a reciprocating slide 33 is mounted. This slide 33 serves to operate three mechanisms, the tucking-blade and the pasting mechanism, to be hereinafter described, and a horizontally-reciprocating plunger 34 for feeding the cigars from the lower end of the chute to the position over the opening 35 in the table A under the horizontally-reciprocating plunger 34. This plunger 34 has a shank 35', guided in a guide 36, secured to the top of the table A by screws passing through holes $b^2$. A pivot at the end of the slide 33 and a pivot 38 at the left end of the shank 35' are connected by a lever 39, having slotted ends engaging both pivots and fulcrumed at 40 to the top of the table A. The slide 33 is operated by a link 41, pivoted to the upper end of a lever 42 and to the slide. The lever 42 is journaled at its lower end to the bracket 7' and is provided with a roller 43, engaging a groove 44 in the cam-plate 2. The lower right-hand end of the chute 25 is cut away for the length of a cigar, and through this opening the plunger 34 is adapted to pass. When the plunger is withdrawn, however, from beneath the chute, a pivoted door 45 closes this lower opening. This door is operated by means of an arm 45' projecting into the path of the movement of the bar 28 of the plunger P. The opening 35 in the table A is recessed, as shown at $c$ $c$, near each end, where light springs 46 46 are fastened, of sufficient strength to prevent the cigar by its own weight from falling past their retaining-grip, but so weak that a cigar may readily be forced between them and past them without in any way injuring the cigar. The plunger 34 is shaped at its outer face in a curve corresponding to that of a cigar and has an inclined top plate 47, which never passes entirely to the right of the cigars in the chute. This plate 47 being on an incline, the retraction of the plunger 34 slightly lifts all the cigars in the chute, joggles them, and drops them, thus greatly assisting the feed. The pivoted door 45 entirely prevents a cigar resting on the top of the table after the plunger's withdrawal from rolling to the right until the proper moment has arrived, and it is forced in that direction by the plunger 34 when the door will have been opened by the rise of the plunger P.

The vertically-reciprocating plunger P is preferably provided with spring-fingers 48 and 49, (49 being the shorter,) under which springs 49 in the plunger's upper position a cigar may freely pass and abut against the fingers 48 and drop onto the springs 46 over the opening 35. Beneath the transverse bar 28 of this plunger P a transverse spring 51, more or less cigar-shaped, is secured, while at the center a Z-shaped spring-blade 52 is fastened. It will readily be seen that upon the descent of the plunger P the cigar resting upon the spring-fingers 46 obstructing the opening 35 will be firmly though elastically held between these springs 48, 49, 51, and 52, which by the continued motion of the plunger P will cause the cigar to be forced through the opening 35 against the retarding action of the springs 46. The cams are so timed that when this has occurred a band will have been previously fed immediately below the spring-fingers 46 and pasted at its tongue-like end, and it is at this point that the cigar enters the clutch-like carriage C, all of which will be more specifically described hereinafter.

Figures 10, 10A, 11, 23, 24, 25, 26, 27, 28, 29, 30, 31, 31A:
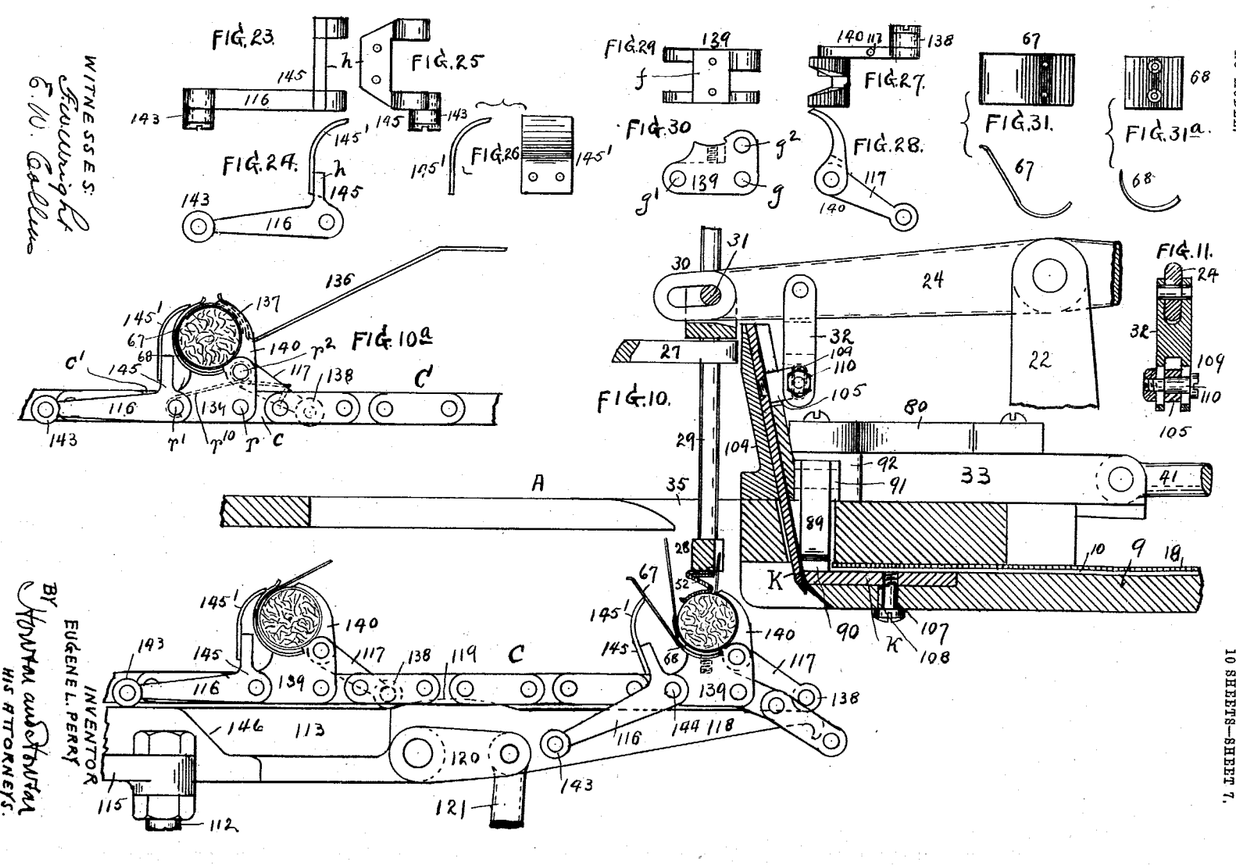
Figure 12:
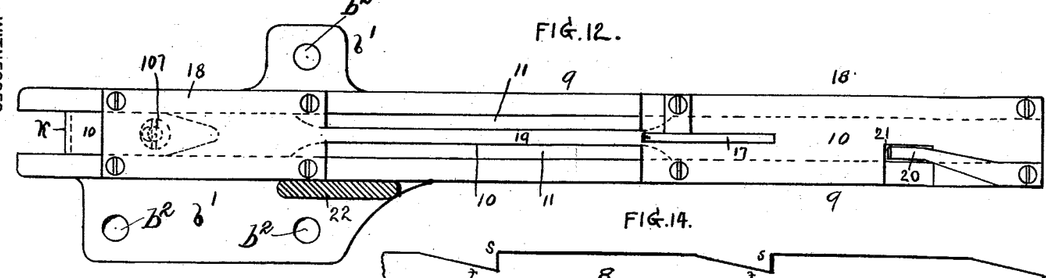
Fig. 12 is a top plan of the feed-case, the arm 22 in section.

Parallel to the cam-shaft 1 there is mounted within the side plates of the table a shaft 54, with which a sprocket 55 rotates. This shaft is rotated by means of three gears 56 and 57, mounted in bearings in the side legs of the table, and 58, fastened on the shaft 6 of the star-wheel 5. At the extreme left end of the base B bearings 60 are secured, between which a second sprocket 61 rotates upon its shaft 62. A chain C, carrying clutch-like carriages, travels between these two sprockets and is intermittently operated by the star-wheel 5 to move one clutch-like carriage into position immediately beneath the plunger P and opening 35 in the table-top in one revolution of the cam-shaft. In this position the chain of carriages remains until the operating-lever 4 completes one revolution and engages with the next opening of the star-wheel. It is when in the stationary position that the cigar and band are forced down into the jaws of the carriages and the strip severed by the knife K, leaving two projecting upstanding ends to the band. The forward spring-jaw 145 of the carriage is pivoted to the chain and normally hangs in the position of Fig. 4, allowing the two springs 67 68 to open out to readily receive the cigar to be forced between the two jaws, while the other jaw, 140, is pivoted to the chain and is cut away between its sides, as shown in Figs. 27, 28. Each of these two jaws has an operating lever-arm and a roller mounted at its outer ends, while certain cam means, hereinafter described, are provided to act on the lever-arms to cause the jaws to close together at the appointed time to clutch the cigar at its banded center.

Figure 1:
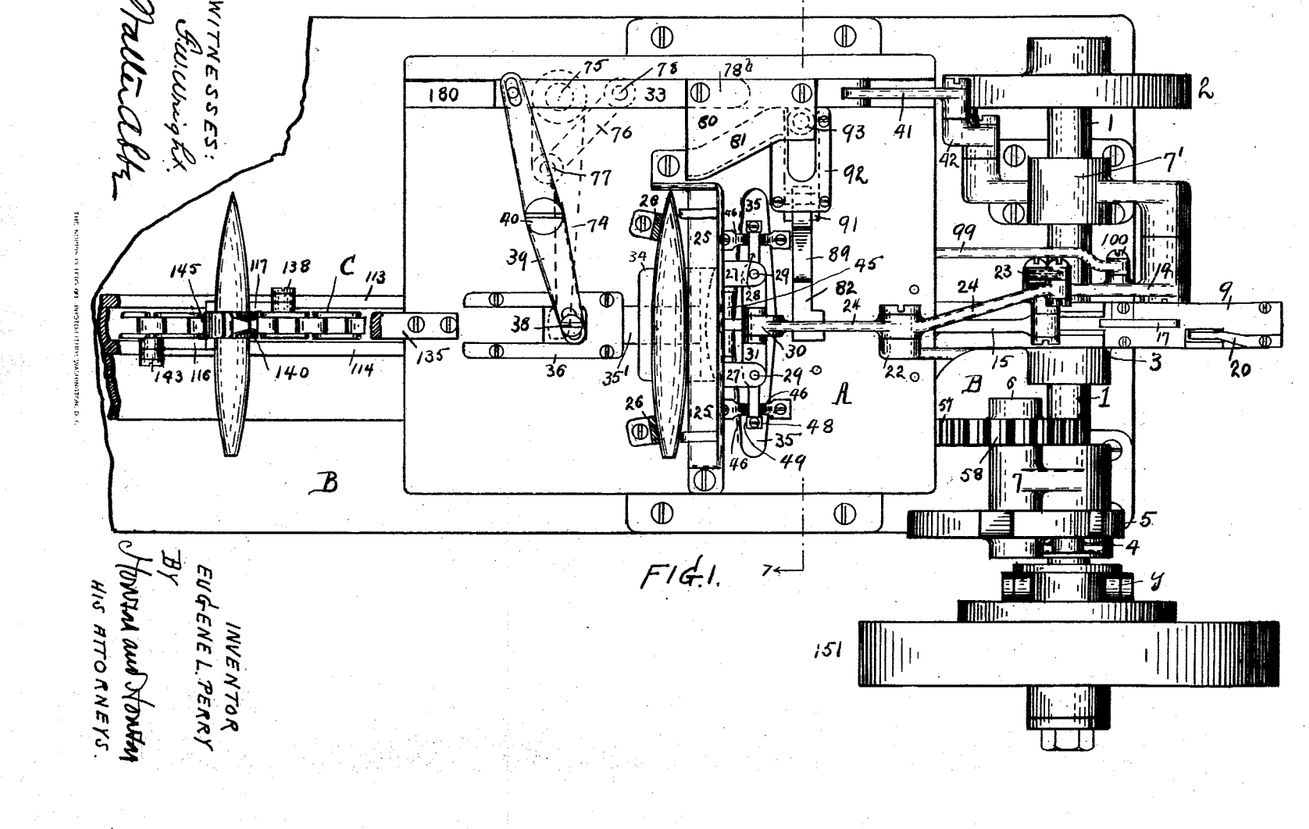
Figure 1 is a plan view of a machine of my invention.
Figure 4:
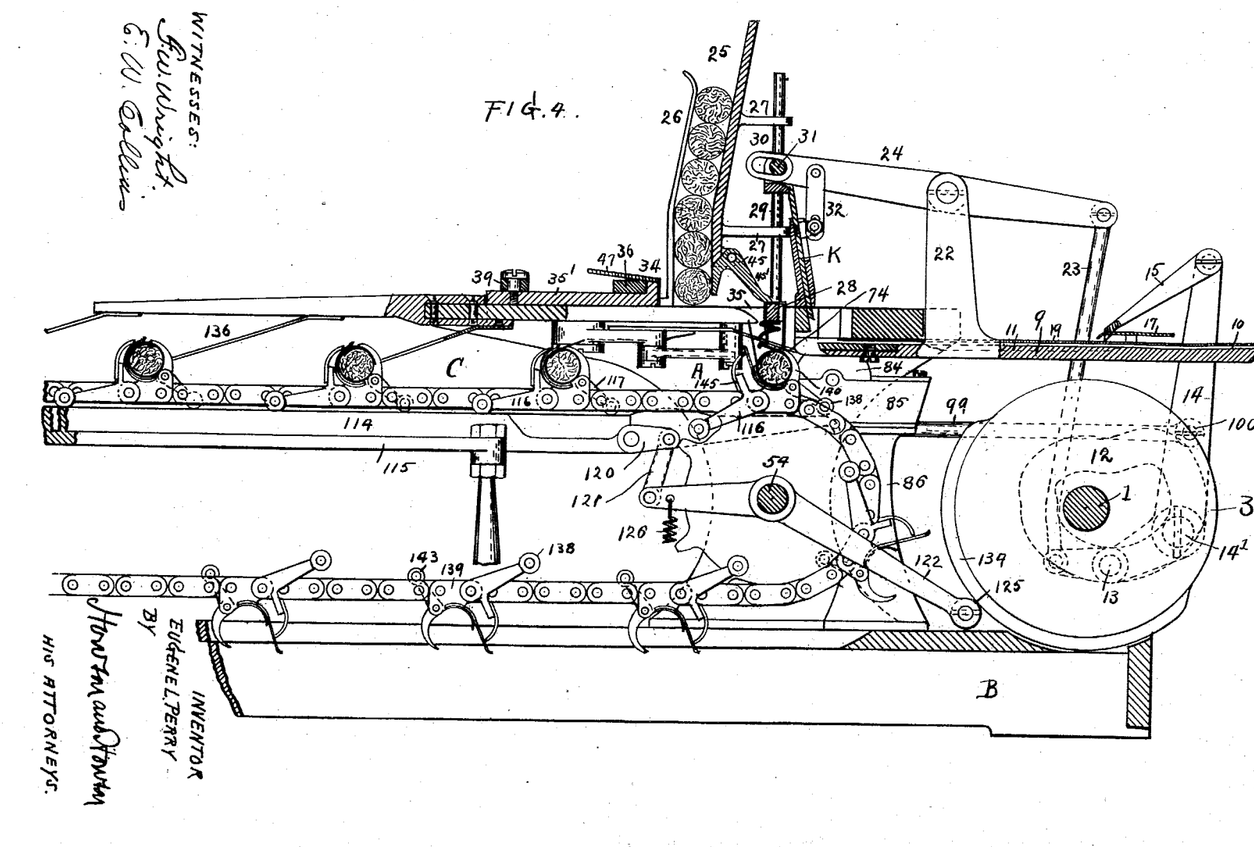
Fig. 4 is a view similar to Fig. 3, but with the mechanism in a position after a cigar has been fed to the carriage.

On the under side of the table-top A a tucking-blade 74 is pivoted at 75, while a link 76, pivoted to the blade at 77 and to the slide 33 at 78 by an upwardly-extending sleeve $78^a$ of the link projecting through a slot $78^b$ in the groove 180, serves to move this blade in an arc of a circle from the position shown in Fig. 1 before a cigar has been forced into the carriage by the plunger P to a position shown in Fig. 4. The end 79 of this blade is shaped as shown and serves immediately after the cigar has been clutched between the jaws 140 and 145 to move forward to tuck in the extending rear end of the band beneath the extending forward end of the band just after an extending part 118 of a cam-rail 113 has operated the bifurcated jaw 140 and prior to the time when the jaw 145 has clutched and compressed the cigar at the point to be banded, as hereinafter described. The extending forward end of the band has before this received a dab of paste on its tongue $t$.

Figure 7:
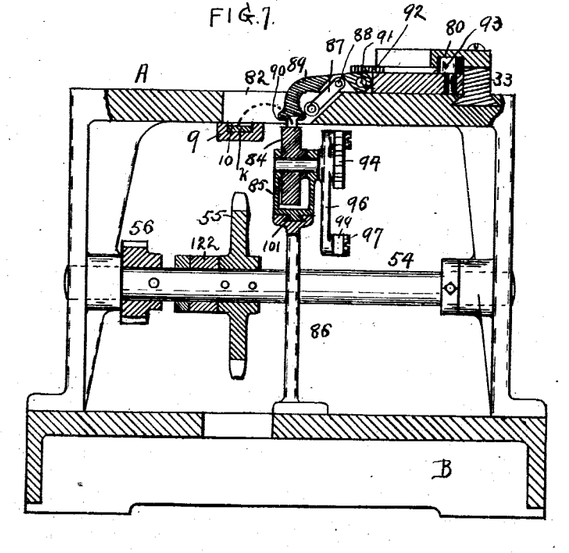
Fig. 7 is a section on line 7 7, Fig. 1.
Figure 8:
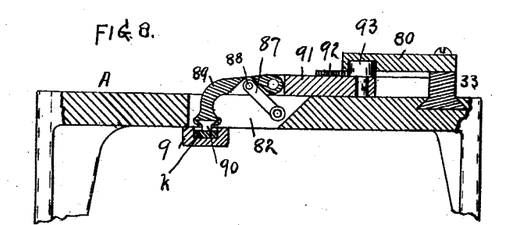
Fig. 8 is a similar view of part of Fig. 7, showing the pasting mechanism in position to deposit paste on a band.
Figure 9:
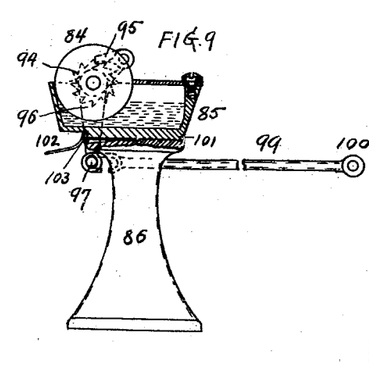
Fig. 9 is a sectional side elevation of the paste-box, roller, and operating-arm.

The slide 33 has attached to its upper face a cam-plate 80, having a cam-groove 81. An opening 82 is formed in the cover A, immediately beneath one end of which rotates a paste-roller 84, journaled in a paste-box 85, mounted on a stand 86, secured to the base B. Within the opening 82 a link 87 is pivoted at one end 88 to a pivoted arm 89, carrying at its free end a piece of rubber or similar dabber 90 to rest on and take paste from the roller 84 and deposit it upon the tongue of a strip in the feed-case. This arm 89 is pivoted to a transversely-reciprocating rod 91, mounted in guides 92, secured by screws passing through the guide and secured in holes $dd$ in the table A, and carries at its end a roller 93, engaging in and operated by the cam-groove 81 in the cam-plate 80, so that upon the reciprocation of the slide 33 the roller will be caused to travel toward and away from the slide. To reciprocate the rod 91, lift the pivoted lever 89 on account of its link connection 87 in an arc, (shown in dotted lines, Fig. 7,) from the top of the paste-roller, where it normally rests, to a position over the inner end of the case 9 at a point immediately beneath the end of the opening 82. This paste-roller is operated by a ratchet 94 and pawl 95, mounted on a lever 96, having a stud 97 at its lower end. A rod 99 has a slot in one end, in which the stud 97 is adapted to rest. This slot is cut away at the bottom to allow the rod to be hooked over the stud 97. The rod 99 is pivoted to the before-mentioned bell-crank lever 14 and serves to intermittently rotate the paste-roller slowly within the paste-box 85. This slotted end is so proportioned that its hooked end will not engage the stud 100 except when the dabber has left the paste-roller. The paste-box is shown in Figs. 7, 8, and 9 and is formed with a tongue 101 on its under side fitting into a corresponding groove in the top of the standard 86. A spring 102 serves to lock the paste-box in position when a shoulder 103 of the box has passed over the projecting end of this spring 102. To prevent complete withdrawal of the paste-box through the groove, the tongue and groove may be formed tapered.

Between the openings 82 and 35 a slanting guide 104 is secured to the table-top for the reciprocating knife K, which has near its upper end a lug 105, to which is adjustably secured the link 32, fastened to the lever 24. Upon the downward motion of the plunger and lever 24 the knife K also descends, and as the paper and cigar are forced into the jaws of the carriage just before the cigar reaches the bottom thereof the knife severs the band at a point where the tongue and shoulders are joined. It is immediately after this severance that the arm 140 is moved into the position of Fig. 10. The stationary knife $k$ is inset flush with the bottom of the case 9 and secured therein by a screw 107 passing through a slot 108 of the case to permit adjustment for wear. The adjustable connection is shown best in Fig. 11. This adjustment is accomplished by forming the lower end of the link 32 bifurcated, each bifurcation having through its face a slot 109, through which a shouldered bolt 110 passes, on the center of which bolt the lug 105 freely fits.

On the base B two posts 112 112 are bolted, carrying at their upper ends a pair of tracks 113 114, supported by a plate 115, which is supported beneath the endless chain C Each track is parallel with the chain and so close to it as to serve as rails on which the levers 116 117 of the carriage bear.

Figure 2:
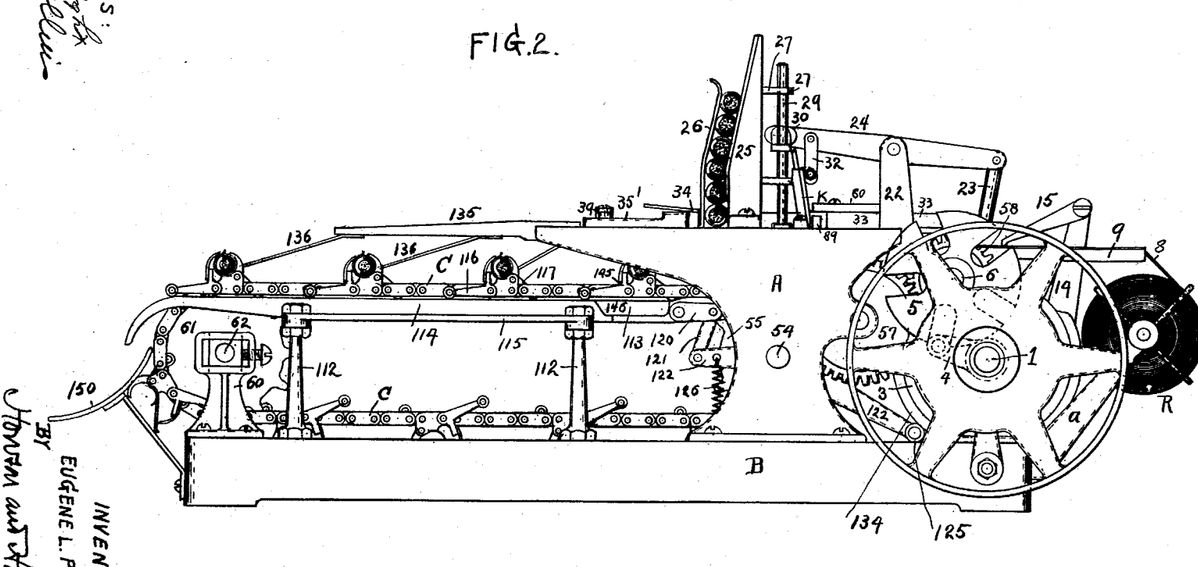
Fig. 2 is a side elevation to a smaller scale.
Figure 3:
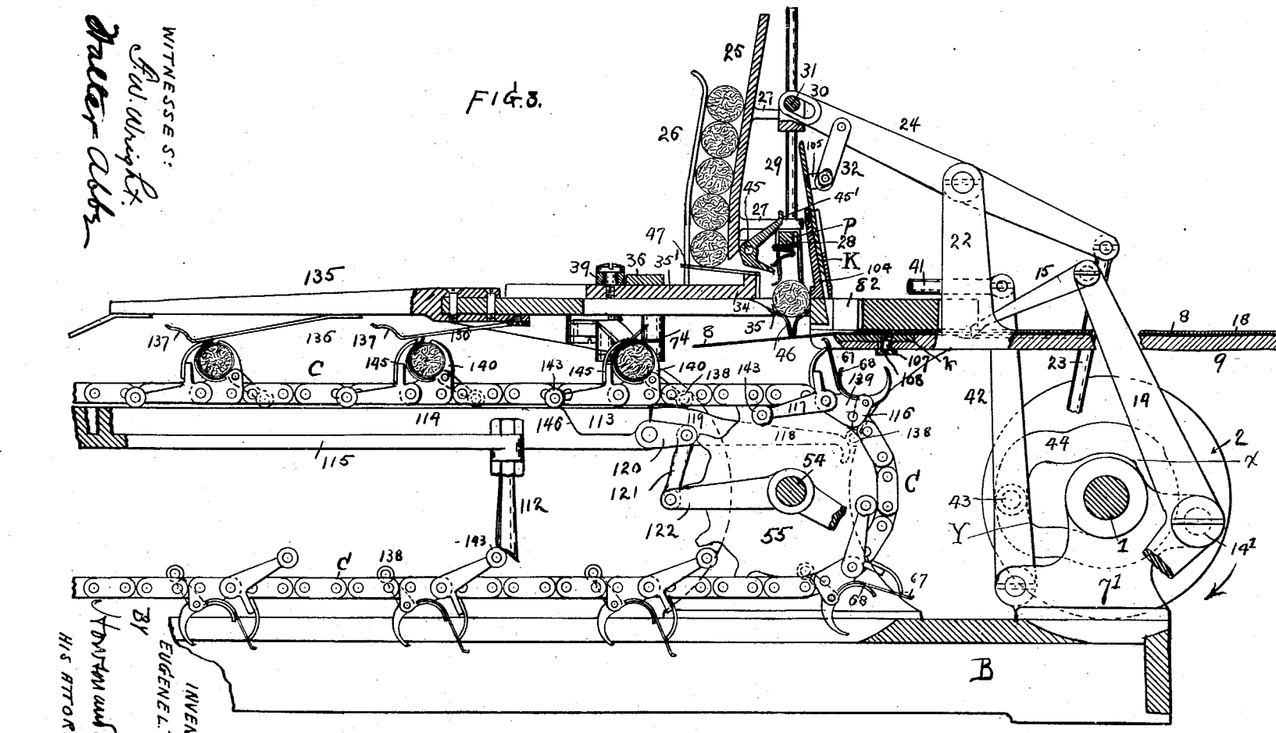
Fig. 3 is a sectional view through the paper-feed case, showing the mechanism at a time when the endless chain of carriages is moving.

The rail 113 has an extension 118, pivoted to the plate 115 at its inner end and operated by a lever 120, link 121, and lever 122, mounted loosely on the sprocket-wheel shaft 54 and carrying a roller 125 at its free end bearing against cam-surface 134 of the cam 3. The spring 126, secured to the lever and the base and partly shown in Figs. 2 and 4, tends to always keep the roller against the cam-surface.

As shown in my drawings, an enlargement 119 is formed on the arm 118. This is on account of the nearness of the carriages, for when the roller 138 has reached 119 the cam 134 releases lever 122 and arm 118 to permit the next carriage to first come under the plunger P with both jaws relaxed.

Secured to the table A by screws passing through holes $e\ e$ is an arm 135, projecting to the left and carrying a number of spring-fingers 136, having upturned ends 137 and projecting downwardly so far that they will come into contact with the upstanding forward end of the band as the carriage passes under the ends 137, thus pressing down the pasted end of the band upon the tucked-in end.

In Fig. 10, to the right, is shown the cigar in position within the carriage just as the plunger P is about to rise and immediately after the cam-surface 134 has acted upon the lever 122 to raise the projecting end 118 of the rail 113 to its upper position. As shown in this figure, the roller 138 on the arm 117, pivoted between enlarged link-plates 139, has been moved to cause the bifurcated jaw 140 to grasp the cigar on the right-hand side, leaving the extending severed end of the band projecting upwardly and very slightly compressing the cigar and band between this jaw 140 and the smaller spring 68. The plunger is then raised, and, as before described, the folding-blade 74 tucks in the extending rear end of the band. Soon after the chain C begins to move between the forward upstanding end of the band and the cigar in much the same position shown in Fig. 3. At this time no pressure except that slight pressure due to the spring 68 and the bifurcated jaw 140 has been exerted on the cigar. However, as the chain C advances the roller 143 on the lever 116, pivoted to the side plates 139 at 144 and carrying the spring-metal blade 145', bearing against the spring 67, comes into play to cause the jaw 145 to grasp the cigar. For this purpose the roller comes into contact with the incline 146 at the forward end of the rail 114, to raise the lever 116, as shown at the left of this figure. The chain through trunnions 60 is always kept taut, the tension of which causes the two rollers of the levers 116 117 to bear with considerable force against the rails 113 114 to cause the blade 145' of the left-hand jaw and the bifurcated jaw 140 to securely grasp the cigar around its banded center, causing the spring and ends of the bifurcated jaw to almost meet and leaving the extended under-side-pasted tongue of the band in the position to the left of this, Fig. 10, and centrally extending over the opening between the bifurcations of the jaw 140. Both the cigar and the band are caused in this position to smoothly lie against each other. As the chain C advances and intermittently during its advance as the chain passes beneath the opening 35 the turned-up end 137 of this spring bears on the top of the extending end of the band and, as shown in Fig. 10$^a$, presses against it in the curved position between the bifurcations of the jaw 140 at the time the carriage and chain are at rest, having smoothed this end of the band into place during the carriage's motion under it. The ends of the rails 113 114 terminate at the left of the machine, and as the carriage rounds the sprocket 61 the rollers 143 are released from the rails, permitting the blade 145' to release the cigar from its grip, which release is aided by the springs 67 68. Guides 150 are placed near the end of the base near the chain in such a position that the released cigar will be lifted out of its carriage and deposited by these guides to the left of the machine in any convenient receptacle.

The construction of the clutch-like carriage is best illustrated in Figs. 23 to 32 and consists of two parallel side plates 139, connected together by a plate $f$, having a curved upper surface. These plates together serve as a pair of chain-links and are drilled with holes $g$ $g'$. Through the holes $g$ the rod $r$ projects, which is also passed through the block $c$ of the chain. Through the holes $g'$ a rod $r'$ projects, also passing through the block $c'$ of the chain. The rod $r'$ projects beyond the side plates 139, on which projections the jaw 145 is pivoted. To the end of the lever 116 of the jaw there is fitted a roller 143. The spring-blade 145' is secured to a cross-piece $h$. Holes $g^2$ are formed in the side plates 139, through which a rod $r^2$ passes and on which the bifurcated lever 140 is pivoted, its extending arm 117 carrying a roller. A spring $r^{10}$, secured to the rod $r'$, serves to open the jaw 140 when its lever is free from the rail. To the plate $f$ two spring-plates 68 and 67 are secured, which have heretofore been described.

Figure 5:
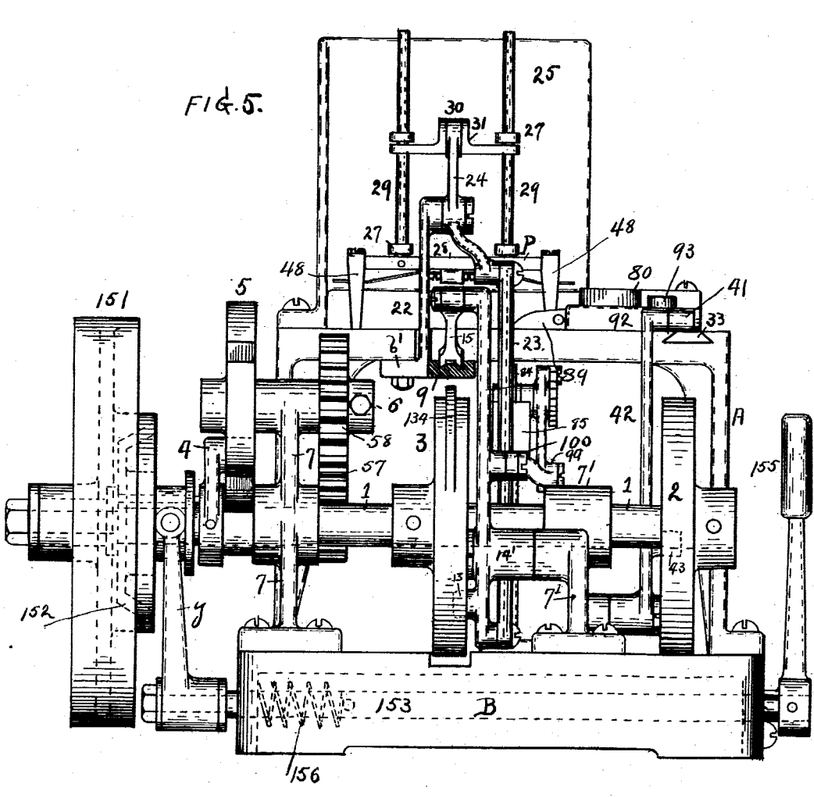
Fig. 5 is an end elevation with the paper-feed case in section and the paper-roll detached.
Figure 6:
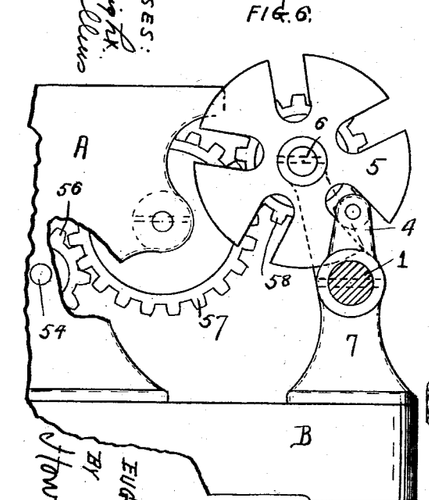
Fig. 6 is a detail to indicate the transmission of motion from the cam-shaft to the chain-carriage sprocket.

Pulley 151, loosely mounted on the cam-shaft 1 and formed with a cone-shaped inner rim 152, is clutched to the cam-shaft by a wedge-shaped clutch movable longitudinally on the shaft and operated by a forked extension $y$ from a transversely-movable shaft 153, passing through the base and operated by a lever 155 to throw the machine out of action, while a spring 156 tends to hold the clutch-surfaces together when in the position of Fig. 5.

The cam 2 has its cam-groove 44 formed of three distinct paths different distances from its center, one part, Y, of which when the roller 43 bears against it throws the lever 42 to the extreme left. The next portion from Y to $x$ causes the lever to occupy the extreme right-hand position, and consequently the lever 42, slide 33, plunger 34, and pasting device are very quickly operated and the tucking-blade brought back to the position of Fig. 4 entirely free from and to the right of the opening 35, while the plunger 34 is withdrawn a distance from the chute and the paste-dabber brought back to rest on the paste-roller. When the roller 43 is moved by the projection $x$, the slide 33 is moved but a slight distance, moving the folding-blade slightly, but to not yet reach the opening 35. The plunger 34 is also moved slightly, but to not yet enter beneath the chute 25, while the paste-dabber is raised off of the strip in the case. The projection $x$ is necessary, because it is at this time that the paper strip must be fed forward, which could not be effectively done with the dabber on the band.

The cam 3 has a cam-groove 12 and a cam-surface 134, the cam-groove operating a roller 13 and levers 14 23, knife and vertical plunger, feed-pawl, and paste-box rod. The cam-surface 134 operates the lever 122 and rail extension 118.

The star-wheel revolves once in each revolution of the cam-shaft one-fifth of its circumference and is so geared (as shown in the drawings) that the sprocket 55 is thereby revolved the distance between two carriages.

When the star-wheel is advancing, the cam 2 is moving the slide 33 to the left, moving the tucking-blade arm so as to travel with and tuck in the rear end of the band as the carriage containing the band and the cigar moves to the left. The horizontal plunger at the same time feeds a cigar to the springs 46 of the opening 35 and moves the paste-dabber onto the paste-roller. At this time the plunger P and knife are being raised by the cam 3 and are near the top of their movement, while the feed-pawl 15 is feeding in a new band. The next carriage is soon brought under the opening 35, and the star-wheel ceases to revolve. The cam 3 then proceeds to cause the plunger P and knife to descend at the same time, returning the feed-pawl 15 toward the bridge 17, and just as the cigar is about at the bottom of the carriage the knife severs the band from the strip, thereby always insuring a definite length of upstanding rear band. Immediately upon this severance the cam-surface 134 throws the bifurcated jaw 140 into closed position and holds the cigar and band. While the plunger P was descending and during its very first motion, the cam 2 had quickly moved the slide 33 to the right, withdrawing the horizontal plunger from the chute, moving the dabber to paste a dab on the tongue of the band, and moving the tucker-arm back out of the way of the springs 49 of the descending plunger P; but after the strip was severed the point x of the cam lifted the dabber free from the strip, as before described. The plunger P then starts to rise to release the cigar held within its springs and leave it within the clutch. When it has risen a certain distance, the star-wheel again starts to rotate. At the same time the slide 33 is operated as set out at the beginning of this statement of operation.

I claim as my invention—

1. A cigar-banding machine, comprising jaws, shaped when closed to conform to the cross-section of the cigar and to substantially surround it, and means for causing said jaws to compress a cigar and band held by them, in combination with means for uniting the ends of the band while the cigar is in the compressed condition, substantially as described.

2. A cigar-banding machine, comprising jaws, shaped when closed to conform to the cross-section of the cigar and to substantially surround it, and means for causing said jaws to compress a cigar and band held by them, in combination with means for pasting the band ends together, and means for holding the cigar compressed to allow the pasted ends to adhere, substantially as described.

3. A carriage of a cigar-banding machine having clutch-like jaws adapted when closed to substantially encircle the entire cigar, and means for opening and closing the jaws, in combination with means for feeding a band and cigar to said carriage, and means for securing the band ends while the jaws are closed on said cigar and band, substantially as described.

4. A carriage of a cigar-banding machine having clutch-like jaws adapted when closed to substantially encircle the entire cigar, and means for opening and closing the jaws, in combination with means for feeding a band over said open jaws, means for feeding a cigar against the band and into the jaws, means for tucking in one end of the band, means for then compressing the jaws around cigar and band, and means for uniting the band ends while compressed, substantially as described.

5. A carriage for a cigar-banding machine having a pivoted bifurcated jaw and a second jaw, and springs in said carriage adapted to be moved toward said bifurcated jaw by the second jaw, substantially as described.

6. A carriage for a cigar-banding machine having pivoted jaws, plates on which they are mounted, springs secured to said plates, the springs adapted to be compressed upon the movement of the jaws toward each other, substantially as described.

7. A carriage for cigar-banding machines, comprising an endless chain, side plates therefor and pivoted jaws mounted on said side plates, spring means on the carriage against which the side of a cigar is adapted to be compressed upon the closing of said jaws, and means to close said jaws after the receipt of a cigar by them.

8. A carriage for cigar-banding machines comprising an endless chain, side plates therefor, a short and long spring-blade mounted on said side plates, a bifurcated jaw pivoted on said side plates and a second jaw pivoted thereon adapted to control said spring-blades, substantially as described.

9. A machine for banding cigars comprising means for feeding a continuous strip of bands, means of feeding a cigar to a band of said strip, means for depositing a dab of paste on said band, a carriage beneath said cigar and band onto which the cigar and band are fed, means for severing the band from the strip, means for compressing the cigar within the carriage, and means for pasting the band ends while the cigar is compressed, substantially as described.

10. A machine for banding cigars comprising means for feeding a continuous strip of bands, means for feeding a cigar to a band of said strip, means for depositing a dab of paste on said band, a carriage beneath said cigar and band onto which the cigar and band are fed, means of severing the band from the strip after the cigar and strip have both entered the carriage, means for compressing the cigar within the carriage, and means for pasting the band ends while the cigar is compressed, substantially as described.

11. A machine for banding cigars comprising means for feeding a continuous strip of bands, means for feeding a cigar to a band of said strip, means for depositing a dab of paste on said band, a carriage beneath said cigar and band onto which the cigar and band are fed, means for severing the band from the strip, two jaws on the carriage, means for slightly compressing one jaw upon the cigar, means for tucking in the upstanding rear end of the band, means for then compressing the other jaw upon the cigar, and means for pasting the band ends together while the cigar is thus compressed, substantially as described.

12. A cigar-banding machine comprising a base and a table, a chute, a spring-closed opening in the table, means for feeding a cigar from said chute to said opening, a plunger to force the cigar through said opening, a carriage beneath said opening and a strip-feed case adapted to feed a band over said carriage and below said opening, in combination with means for compressing a cigar and band within said carriage and means for pasting said band while compressed.

13. A cigar-banding machine comprising a base, a table, a chute, an opening in the table, a plunger for feeding a cigar from the chute to the opening, a plunger to feed the cigar through the opening, a feed-case adapted to guide a band into position beneath said opening and a carriage adapted to compress a cigar and band beneath said opening, and means for pasting the band ends while the cigar is compressed, substantially as described.

14. A cigar-banding machine comprising a chute, a horizontal plunger therefor, a table, an opening therein, a vertical plunger, a feed-case for the bands, carriages having pivoted jaws adapted to compress a cigar, and means for intermittently operating said carriages to cause one to occupy an open position beneath the opening and to receive a cigar, in combination with means for closing a jaw of the carriage while a carriage remains beneath the opening.

15. A chute for a cigar-banding machine, comprising a horizontal plunger, a transverse opening at the lower end of the chute, through which said plunger may pass, a pivoted door to said opening and a vertical plunger adapted to operate said door.

16. In combination, a carriage having clutch-like jaws so shaped as to substantially surround a cigar when compressed, and adapted to hold slightly compressed a cigar and band between them when first fed thereto, with upstanding ends of the band projecting from the carriage, one next to each jaw, and a tucker-blade adapted to tuck one end of the band between the cigar and the other end at the point where the jaw is slightly compressing said band and cigar, whereby, upon the removal of the tucker-blade, the band will be held gripped between the cigar and jaw, substantially as described.

17. In a cigar-banding machine, a cigar-compressing carriage, a cigar-feeding plunger, a band-feed case and means for feeding a band therethrough, a pasting-dabber adapted to deposit a dab of paste on the forward end of a band while the mid-portion of the preceding band is between said plunger and carriage, and means for severing the preceding band from the strip while the dabber is yet in position on the strip.

18. In a cigar-banding machine, a cigar-compressing carriage, a cigar-feeding plunger, a band-feed case, a paste-dabber, a tucking-arm and a horizontal plunger, a slide operating the dabber, horizontal plunger and tucking-arm, substantially as described.

19. In a cigar-banding machine, a cigar-compressing carriage, a cigar-feeding plunger, a band-feed case, a paste-dabber, a tucking-arm and a horizontal plunger, a slide operating the dabber, horizontal plunger and tucking-arm, and means to operate the slide a slight distance to raise the dabber from the strip, but not sufficiently to cause the arm or plunger to operate functionally, and means to afterward operate all together to cause the plunger to feed a cigar, the arm to travel to a position preparatory to tucking and the dabber to travel to a position to take paste, substantially as described.

20. In a cigar-banding machine, a cigar-compressing carriage, a feed-plunger, a feed-case with a groove, a feed-pawl having pointed edges and a recessed central portion, a bridge over said groove, said pawl adapted to straddle said bridge with its points within the groove, substantially as described.

21. In a cigar-banding machine, a cigar-compressing carriage, a feed-plunger, a feed-case, having a groove throughout, deeper grooves alongside aforesaid groove, a bridge over the aforesaid groove, a pawl having points extending into the deeper grooves, and having a recessed portion adapted to straddle the bridge and means to operate the pawl, substantially as described.

22. In a cigar-banding machine, a cigar-compressing carriage, a plunger for feeding a cigar into the carriage, a band-feed case, a groove in the case, a cover to the groove, a bridge mounted on the cover and above it, said pawl at one end of its movement adapted to rise onto said bridge out of the groove and above the cover, substantially as described.

23. In a cigar-banding machine, a cigar-compressing carriage, a feed-plunger, a band-feed case and a knife, means for operating the plunger to force a cigar substantially within the carriage before the operation of the knife, substantially as described.

24. In a cigar-banding machine, a cigar-compressing carriage, a feed-plunger, a feed-case, and a knife, in combination with a paste-dabber adapted to deposit a dab of paste on a band, means to cause it to remain on said band until the preceding band is severed, means to then move it away from the band, and means for operating the plunger and knife to feed a cigar and sever a band, substantially as described.

25. In a cigar-banding machine, a cigar-compressing carriage, a feed-plunger, a feed-case and knife, a bracket on the feed-case, a lever mounted in the bracket, connected at one end to an operating-rod and at the other to the plunger and the knife, substantially as described.

26. In a cigar-banding machine, a cigar-compressing carriage, a feed-case for strips of bands, a paste-cup and roller at one side thereof, an opening above the case and roller, a dabber and a transverse reciprocating rod therefor adapted to lift the paste-dabber off the roller and onto a strip within the case, substantially as described.

27. In a cigar-banding machine, a cigar-compressing carriage, a feed-case for strips of bands, a paste-roller, an opening above said case and roller, a transverse bar, a pivoted arm, and a paste-dabber, a link mounted in said opening and attached to said pivoted arm, said arm being connected to and operated by the transverse bar, substantially as described.

28. In a cigar-banding machine, a cigar-compressing carriage, an endless chain on which it is mounted, means for advancing the chain, compressing-jaws on the carriage, levers to operate them, rails on which the ends of the levers are adapted to bear after the chain carrying the carriage and cigar has been advanced, one rail having a pivoted part and means for causing said pivoted part to act on a jaw-lever before the carriage has been advanced, substantially as described.

29. In a cigar-banding machine, a cigar-compressing carriage, an endless chain therefor, compressing-jaws thereon, levers to operate said jaws and rails on which said lever ends are adapted to bear to close said jaws, an incline adapted to raise one lever onto a rail upon the traverse of the carriage, and a cam-operated means, and a pivoted part to the other rail to operate the other lever in advance and before the carriage has been traversed, substantially as described.

30. In a cigar-banding machine, a chain of cigar-compressing carriages, a bifurcated jaw therefor, means for tucking in the band end next to the bifurcated jaw, and means for smoothing the other end into the opening between the bifurcations and onto the band, substantially as described.

31. In a cigar-banding machine, a cigar-compressing carriage, a cigar-feed plunger, having springs mounted on its lower face, transverse to the length and depending from the plunger, means for feeding a cigar beneath the plunger, means for forcing the plunger and the cigar held therein into the carriage, means for gripping the cigar in the carriage, to permit the plunger to be withdrawn without the cigar, substantially as described.

32. In a cigar-banding machine, a cigar-compressing carriage, a cigar-feed plunger having a pair of long springs depending from one side and short ones from the other, means for feeding a cigar under and past the short springs, means for forcing all springs down to abut said cigar, and means for forcing it into the carriage, substantially as described.

33. In a cigar-banding machine, a cigar-compressing carriage mounted beneath a table, a plunger mounted to reciprocate through an opening in the table, springs in the opening, means for feeding a cigar to said opening, means for feeding the plunger down onto the cigar to force it through said opening into the carriage, substantially as described.

In testimony whereof I have signed my name to this specification in the presence of two subscribing witnesses.

EUGENE L. PERRY.

Witnesses:
S. C. CONNOR,
F. WARREN WRIGHT.